US012071798B2

(12) United States Patent
Liu et al.

(10) Patent No.: US 12,071,798 B2
(45) Date of Patent: Aug. 27, 2024

(54) ANTI-PINCH DETECTION METHOD AND SYSTEM

(71) Applicant: BEIJING JINGWEI HIRAIN TECHNOLOGIES CO., INC., Beijing (CN)

(72) Inventors: Shuang Liu, Beijing (CN); Weihao Zhu, Beijing (CN); Yanzhao Liu, Beijing (CN); Sheng Jia, Beijing (CN)

(73) Assignee: BEIJING JINGWEI HIRAIN TECHNOLOGIES CO., INC. (CN)

( * ) Notice: Subject to any disclaimer, the term of this patent is extended or adjusted under 35 U.S.C. 154(b) by 232 days.

(21) Appl. No.: 17/625,404

(22) PCT Filed: May 29, 2020

(86) PCT No.: PCT/CN2020/093160
§ 371 (c)(1),
(2) Date: Jan. 7, 2022

(87) PCT Pub. No.: WO2021/004188
PCT Pub. Date: Jan. 14, 2021

(65) Prior Publication Data
US 2022/0228413 A1   Jul. 21, 2022

(30) Foreign Application Priority Data
Jul. 10, 2019   (CN) .......................... 201910620150.5

(51) Int. Cl.
*H02P 29/02*      (2016.01)
*E05F 15/40*      (2015.01)
(Continued)

(52) U.S. Cl.
CPC ............ *E05F 15/40* (2015.01); *E05F 15/603* (2015.01); *E05F 15/70* (2015.01);
(Continued)

(58) Field of Classification Search
CPC ......... H02P 29/02; H02P 7/04; H02H 7/0851; E05F 15/70; E05F 15/603; E05F 15/40;
(Continued)

(56) References Cited

U.S. PATENT DOCUMENTS 5,689,160 A * 11/1997 Shigematsu ............ E05F 15/41
                                                        318/281
5,982,126 A    11/1999 Hellinga
(Continued)

FOREIGN PATENT DOCUMENTS

CN        101220724 B      4/2012
CN        102979397 A      3/2013
(Continued)

OTHER PUBLICATIONS

Search Report issued to counterpart European Application No. 20837595.6 on Jun. 26, 2023.

*Primary Examiner* — Gabriel Agared
(74) *Attorney, Agent, or Firm* — The Belles Group, P.C.

(57) ABSTRACT

The present invention provides an anti-pinch detection method and system comprising: determining a first current change rate according to a current collected in a present period and a previous period; determining a second current change rate according to the current collected in the present period and a target period, there being N periods between the target period and present period; detecting whether a closure component encounters an obstacle according to the second current change rate. If yes, determining the stiffness of the obstacle according to the first current change rate; determining a real-time obstacle compression distance according to a contact position zero point and a motor position collected in real time; and determining a real-time anti-pinch force according to the stiffness of the obstacle and the real-time obstacle compression distance, and controlling a motor to
(Continued)

reverse when the real-time anti-pinch force is greater than a preset anti-pinch detection threshold.

10 Claims, 8 Drawing Sheets

(51) Int. Cl.
*E05F 15/603* (2015.01)
*E05F 15/70* (2015.01)

(52) U.S. Cl.
CPC ..... *E05Y 2201/434* (2013.01); *E05Y 2400/36* (2013.01); *E05Y 2400/40* (2013.01); *E05Y 2400/554* (2013.01); *E05Y 2900/531* (2013.01); *E05Y 2900/542* (2013.01); *E05Y 2900/55* (2013.01)

(58) Field of Classification Search
CPC ......... E05Y 2201/434; E05Y 2900/531; E05Y 2400/44; E05Y 2400/54; E05Y 2400/36; E05Y 2400/554; E05Y 2900/542; E05Y 2900/55; E05Y 2400/40
USPC ......................................................... 318/286
See application file for complete search history.

(56) References Cited

U.S. PATENT DOCUMENTS 8,341,885 B2   1/2013  Bostyn

| | | | |
|---|---|---|---|
| 2002/0101210 A1* | 8/2002 | Boisvert | H02H 7/0851 318/469 |
| 2004/0061462 A1* | 4/2004 | Bent | E05F 15/41 318/280 |
| 2004/0183493 A1* | 9/2004 | Boisvert | H02H 7/0851 318/469 |
| 2005/0067987 A1 | 3/2005 | Nakazawa et al. | |
| 2005/0128660 A1* | 6/2005 | Dlugosz | H02H 9/026 361/23 |
| 2007/0216330 A1* | 9/2007 | Kawakura | H02H 7/0851 318/470 |
| 2014/0083011 A1 | 3/2014 | Sumiya | |
| 2018/0238095 A1 | 8/2018 | Nagao et al. | |
| 2019/0054808 A1* | 2/2019 | Louey | B60J 7/0046 |

FOREIGN PATENT DOCUMENTS

| | | |
|---|---|---|
| CN | 103670117 A | 3/2014 |
| CN | 105201319 A | 12/2015 |
| CN | 106712605 A | 5/2017 |
| CN | 106899254 A | 6/2017 |
| CN | 109291764 A | 2/2019 |
| CN | 110195545 A | 9/2019 |
| EP | 0799736 A1 | 10/1997 |
| EP | 2175330 A1 | 4/2010 |
| EP | 3502389 A1 | 6/2019 |
| JP | 6430911 B2 | 11/2018 |

* cited by examiner

ANTI-PINCH DETECTION METHOD AND SYSTEM

CROSS-REFERENCE TO RELATED PATENT APPLICATIONS

The present application is a U.S. national stage application under 35 U.S.C. § 371 of PCT Application No. PCT/CN2020/093160, filed May 29, 2020, which claims priority to Chinese Patent Application No. 201910620150.5, filed Jul. 10, 2019. The disclosures of the aforementioned priority applications are incorporated herein by reference in their entireties.

FIELD

The present disclosure relates to the technical field of motor vehicle body control, and in particular to an anti-pinch detection method and an anti-pinch detection system.

BACKGROUND

With the development of automobile technology, lots of components controlled and driven by a direct current brush motor are widely used to improve comfort in automobile operations. For example, the motor is used to drive to electrically open or close some movable components, such as a sunroof, a side window, a rearview mirror and a seat. For such close-by-motor system, constraints are made in relevant laws and regulations in terms of protecting personal safety. That is, when a motor operates a closure component to close, an anti-pinch function must be provided within a specified range (4 mm to 200 mm) by the law.

In a European standard and a Chinese standard, a pinch force is required to be less than 100N when a 10 N/mm spring is used to test. In US standard FMVSS118 (hereinafter referred to as S5), the pinch force is required to be less than 100N when a 65 N/mm spring is used to test in a range of 4 mm to 25 mm, and the anti-pinch force is required to be less than 100N when a 20 N/mm spring is used to test in a range of 25 mm to 200 mm. In recent years, in order to obtain a better anti-pinch effect on a closure component and improve safety, more and more automobile manufacturers is required in compliance with S5 regulations, forces measured by springs with different stiffness have a good consistency; and undesired pinching has a low risk. Based on this, an anti-pinch detection method that meets S5 regulations and has a better detection effect is urgently needed.

SUMMARY

In view of the above, an anti-pinch detection method and an anti-pinch detection system are provided according to the present disclosure, which can meet S5 regulations and has a good detection effect on a closure component. Technical solutions of the present disclosure are described below.

An anti-pinch detection method includes:

determining a first current change rate based on a current collected in a present current collection period and a current collected in a previous current collection period, where the current of a motor is periodically collected in a process of controlling an operation of the motor to drive a closure component to close;

determining a second current change rate based on the current collected in the present current collection period and a current collected in a target current collection period, where there are N current collection periods between the target current collection period and the present current collection period, and N is an integer greater than or equal to 2;

detecting whether the closure component contacts with an obstacle based on the second current change rate;

determining a stiffness of the obstacle based on the first current change rate, in a case where the closure component is detected to contact with the obstacle;

determining a real-time compression distance of the obstacle based on an initial contact position and a motor position collected in real time, where the initial contact position is determined based on a motor position collected when the closure component is detected to contact with the obstacle; and determining a real-time pinch force based on the stiffness and the real-time compression distance of the obstacle, and controlling the motor to reverse in a case where the real-time pinch force is greater than a preset anti-pinch detection threshold, where the anti-pinch detection threshold is determined based on the stiffness of the obstacle.

In an embodiment, the determining a second current change rate based on the current collected in the present current collection period and a current collected in a target current collection period includes:

calculating a difference between the current collected in the present current collection period and the current collected in the target current collection period, as the second current change rate; or calculating a difference between a value obtained by filtering the current collected in the present current collection period and a value obtained by filtering the current collected in the target current collection period, as the second current change rate.

In an embodiment, the detecting whether the closure component conies in contact with an obstacle based on the second current change rate includes:

detecting the initial contact position based on the second current change rate, where the initial contact position is a position point at which the closure component starts to contact with the obstacle; and determining that the closure component contacts with the obstacle when the initial contact position is detected.

In an embodiment, the detecting the initial contact position based on the second current change rate includes:

acquiring a motor position collected at present as a candidate initial contact position, in a case where the second current change rate is greater than a preset first threshold;

determining whether the candidate initial contact position is verified;

taking the candidate initial contact position as the initial contact position in a case where the candidate initial contact position is verified; and in a case where the candidate initial contact position is not verified, determining the first current change rate based on the current collected in the present current collection period and the current collected in the previous current collection period, and determining the second current change rate based on the current collected in the present current collection period and the current collected in the target current collection period.

In an embodiment, the determining whether the candidate initial contact position is verified includes:

each time the current of the motor is collected after the candidate initial contact position is obtained, determining whether the candidate initial contact position is verified, based on the second current change rate determined in real time, and/or based on a third current change rate determined in real time and a third current change rate determined previously, where each time the current of the motor is collected, the third current change rate is determined in real time based on the collected current and the current corresponding to the candidate initial contact position.

In an embodiment, the determining whether the candidate initial contact position is verified, based on the second current change rate determined in real time, and/or based on a third current change rate determined in real time and the third current change rate determined previously includes:

determining that the candidate initial contact position is not verified, in a case where at least one of a first situation and a second situation occurs after the candidate initial contact position is obtained; and determining that the candidate initial contact position is verified, in a case where none of the first situation and the second situation occurs after the candidate initial contact position is obtained, where the first situation is that the second current change rate determined in real time is less than a preset second threshold; and the second situation is that a case where the third current change rate determined in real time and the third current change rate determined previously is greater than a preset third.

threshold successively occurs and a duration of the case that the third current change rate is greater than the third threshold is greater than a preset period.

In an embodiment, the anti-pinch detection method further include: controlling the motor to operate at a motor speed corresponding to a region where the closure component is located, in the process of controlling the operation of the motor to drive the closure component to close, where a movable region of the closure component in a closing direction includes multiple regions that do not overlap each other, each of the regions corresponds to a set motor speed, and different regions correspond to different motor speeds, and a region close to a terminal of the movement region in the closing direction corresponds to a smaller motor speed than a region away from the terminal.

A controller includes a memory and a processor.

The memory is configured to store a program.

The processor is configured to execute the program to perform the anti-pinch detection method according to any one of the above embodiments.

A readable storage medium has a computer program stored thereon. The computer program, when being executed by a processor, implements the anti-pinch detection method according to any one of the above embodiments.

An anti-pinch detection system includes a current collecting unit, a position collecting unit, and a controller.

The controller is configured to: control the current collecting unit to collect a current of a motor in a preset current collection period, in a process of controlling an operation of the motor to drive a closure component to close; control the position collecting unit to collect a motor position of the motor in real time; determine a first current change rate based on a current collected in a present current collection period and a current collected in a previous current collection period; determine a second current change rate based on the current collected in the present current collection period and a current collected in a target current collection period; detect whether the closure component contacts with an obstacle based on the second current change rate; determine a stiffness of the obstacle based on the first current change rate, in a case where the closure component is detected to contact with the obstacle; determine a real-time obstacle compression distance based on an initial contact position and a motor position collected in real time; and determine a real-time pinch force based on the stiffness of the obstacle and the real-time obstacle compression distance, and control the motor to reverse in a case where the real-time pinch force is greater than a preset anti-pinch detection threshold.

There are N current collection periods between the target current collection period and the present current collection period, where N is an integer greater than or equal to 2. The initial contact position is determined based on the motor position collected by the position collecting unit when the closure component is detected to contact with the obstacle. The anti-pinch detection threshold is determined based on the stiffness of the obstacle.

In an embodiment, the current collecting unit includes a sampling resistor and a differential amplifier. The sampling resistor is configured to convert the current in an operation process of the motor into a voltage signal. The differential amplifier is configured to amplify the voltage signal to obtain an amplified voltage signal.

The controller is configured to collect the current of the motor in the preset current collection period, based on the amplified voltage signal.

In an embodiment, the controller is further configured to control the motor to operate at a motor speed corresponding to a region where the closure component is located, in the process of controlling the operation of the motor to drive the closure component to close.

A movable region of the closure component in a closing direction includes a plurality of regions that do not overlap each other, each of the regions corresponds to a set motor speed, and different regions correspond to different motor speeds, and a region close to a terminal of the movable region in the closing direction corresponds to a smaller motor speed than a region away from the terminal.

As known from the above, an anti-pinch detection method and system are provided in the present disclosure. In the process of the motor operating to drive the closure component to close, a first current change rate is determined based on a current collected in a present current collection period and a current collected in a previous current collection period, and a second current change rate is determined based on the current collected in the present current collection period and a current collected in a target current collection period. Then, it is detected based on the second current change rate whether the closure component contacts with an obstacle. A stiffness of the obstacle is determined based on the first current change rate when the closure component is detected to contact with the obstacle. A real-time obstacle compression distance is determined based on an initial contact position and a motor position collected in real time. Finally, a real-time pinch three is determined based on the stiffness of the obstacle and the real-time obstacle compression distance, and the motor is controlled to reverse when the real-time pinch force is greater than a preset anti-pinch detection threshold. With the anti-pinch detection method, the obstacle is quickly and accurately detected based on the second current change rate; and the stiffness of the obstacle is determined based on the first current change rate, so that different stiffness values of the obstacles may be obtained for obstacles with different stiffness, and different anti-pinch detection thresholds may be selected based on the different stiffness values of the obstacles. In this way, consistency of measuring forces can be ensured, thus avoiding false anti-pinch due to applying a single small anti-pinch detection threshold when only one pinch anti-detection threshold is used. In summary, the anti-pinch detection method provided in the embodiments of the present disclosure satisfies S5 regulations, has a fast detection speed and a good detection effect, and can avoid false anti-pinch.

BRIEF DESCRIPTION OF DRAWINGS

In order for a clearer illustration of embodiments of the present disclosure or technical solutions in the conventional technology, hereinafter is a brief introduction of drawings to be used in description of the embodiments or the conventional technology. Apparently, the drawings described below are merely embodiments of the present disclosure, and those skilled in the art can obtain other drawings based on the provided drawings without any creative effort.

DETAILED DESCRIPTION

Figure 1:
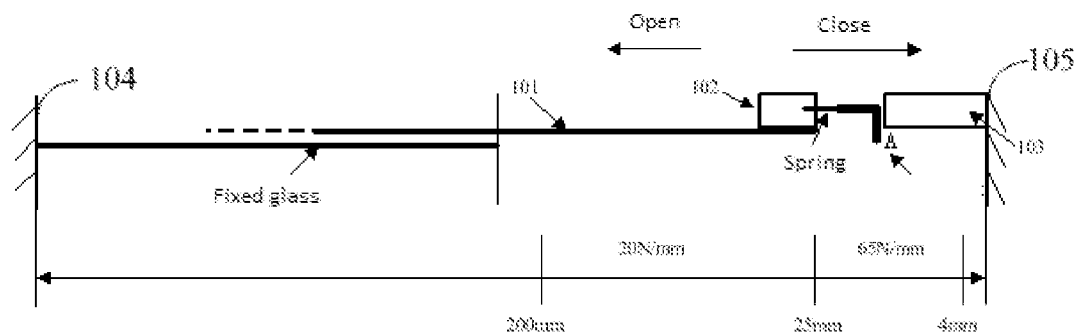
FIG. 1 is a schematic diagram showing a definition of an S5 anti-pinch region and an anti-pinch process according to an embodiment of the present disclosure.

The technical solutions in the embodiments of the present disclosure are clearly and completely described in the following with reference to the accompanying drawings in the embodiments of the present disclosure. Apparently, the embodiments described herein are merely a part rather than all of the embodiments of the present disclosure. Any other embodiments obtained by those skilled in the art based on the embodiments in the present disclosure without any creative effort shall fall within the protection scope of the present disclosure.

To obtain an anti-pinch detection scheme for a closure component which meets S5 regulations and realizes a better effect, the inventor of the present disclosure conducted a study and obtained the following findings.

Some conventional anti-pinch detection schemes for a closure component are generally based on a motor speed. According to a general concept in such a scheme, the motor speed decreases if an obstacle is contacted in a process of closing the closure component. In view of this, a pinch force may be determined based on the motor speed. Specifically, a difference between an actual movement speed and a preset reference movement speed of the motor is calculated, the pinch force is calculated from the calculated difference of speeds. The motor is controlled to reverse when the pinch force is greater than a preset anti-pinch detection threshold.

The inventor found in study that the anti-pinch detection scheme based on a motor speed can pass the test under a 10 N/mm spring, but it cannot pass an anti-pinch test under S5. The anti-pinch detection scheme based on the motor speed may pass the anti-pinch test under S5, by reducing the anti-pinch detection threshold to increase detection sensitivity. However, a critical defect in increasing the detection sensitivity by reducing the anti-pinch detection threshold is that, if the obstacle has a large stiffness, the anti-pinch detection threshold is required to be very small to achieve pitch force less than 100N specified in the regulations. However, the very small anti-pinch detection threshold may cause false anti-pinch detection due to excessively high detection sensitivity, and thereby cause failure of normal closing of the closure component.

In view of the problem in the anti-pinch detection scheme based on a motor speed, the inventor attempts to get rid of the anti-pinch detection method based on a motor speed, and implement an anti-pinch detection scheme for a closure component satisfying S5 regulations in another manner. The inventor founds by analysis the following difficulties in making the anti-pinch detection scheme for the closure component meet S5 regulations. The difficulties includes: a fast anti-pinch detection and motor reversal for an obstacle with a high stiffness; and distinguishing obstacles with different stiffness, for example, distinguishing a 65 N/mm spring from a 20 N/mm spring to ensure consistency in measuring forces for obstacles with different stiffness. The analysis is performed as follows.

Figure 2:
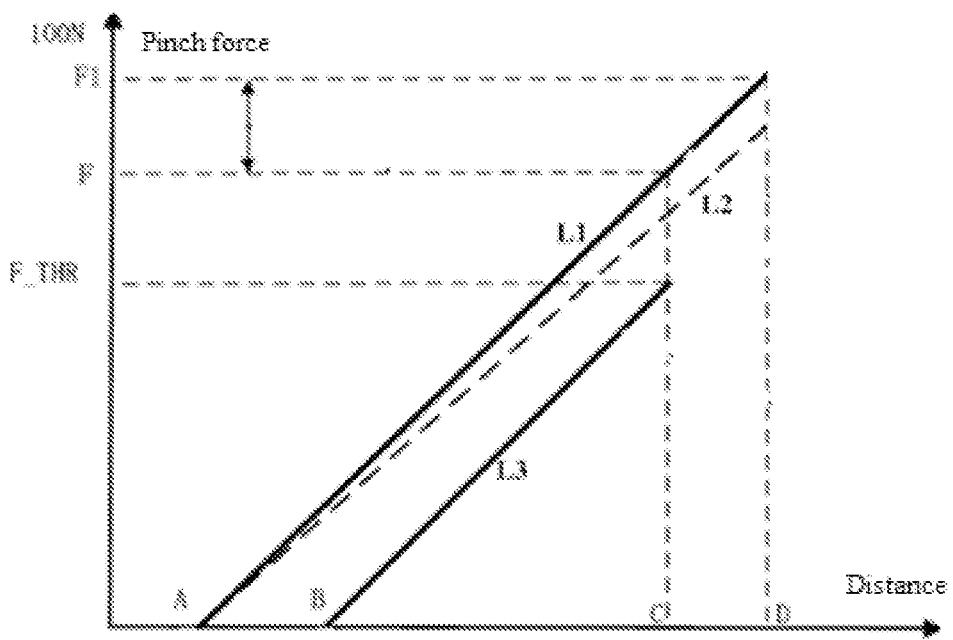
FIG. 2 is an analysis diagram of a process from a dynamometer in contact with an obstacle to a recognition of an anti-pinch event and a glass being controlled to move reversely according to an embodiment of the present disclosure.

Referring to FIG. 1, taking a sunroof as an example, a definition of an S5 anti-pinch region and a process of an anti-pinch detection are shown. A dynamometer 102 is fixed together with a movable glass 101. In a range of 4 mm to 25 mm, a 65 N/mm spring in the dynamometer 102 is used for testing; and in a range of 25 nm to 200 mm, a 20 N/mm spring in the dynamometer 102 is used for testing. In FIG. 1, an obstacle is indicated as 103, a fill open position of a glass is indicated as 104, and a full closed position of the glass is indicated as 105. FIG. 2 shows a schematic diagram of an entire process from a dynamometer in contact with an obstacle to a recognition of an anti-pinch event and a glass being controlled to move reversely. In FIG. 2, a point A indicates a point of the dynamometer in contact with the obstacle; a line L1 reflects a relationship between a pinch force measured by the dynamometer and a compression distance, for a 65 N/mm spring; a line L2 reflects a relationship between a pinch force measured by the dynamometer and a compression distance, for a 20 N/mm spring; a point B indicates that a controller starts an anti-pinch detection; a line L3 reflects a relationship, determined by the controller, between the pinch force and the spring compression distance; and a segment AB indicates a detection delay. Due to a certain physical delay in a transmission system of the sunroof, the controller recognizes a signal change at point B, when the spring begun to be compressed since point A. Point C indicates a point at which the controller detects the pinch force greater than a set anti-pinch detection threshold. At this point, the controller transmits a reversal command to the motor, to control the motor to reverse. Point D indicates an actual reversal position of the glass. Segment CD indicates a reversal delay. After the controller transmits the reversal command to the motor, the movable glass moves forward for a certain distance due to inertia, resulting in further compression of the spring and the pinch force greater than the anti-pinch detection threshold F_THR. It should be noted that F in FIG. 2 represents a pinch force measured by the dynamometer using the 65 N/mm spring when the controller detects that the pinch force exceeds the anti-pinch detection threshold F_THR; F1 in FIG. 2 indicates the pinch force measured by the dynamometer using the 65 N/mm spring when the glass is actually reversed; and ΔF1 indicates a difference between F1 and F. In S5 regulations, the spring compression distance between point A and point D shall be less than 1.53 mm (100N/65 N/mm) according to the strictest requirement. Therefore, a reasonable anti-pinch detection method needs to be designed to reduce the detection delay and the reversal delay, and detect the anti-pinch event quickly within a short distance. In order to ensure the consistency in measuring forces for obstacles with different stiffness, the stiffness of the obstacle should be identified and anti-pinch detection threshold corresponding to the identified stiffness may be selected. It should be noted that in a test stage, the obstacle is a spring in fact, and the stiffness of the obstacle is a stiffness of the spring. In a practical stage, the stiffness of the obstacle is the stiffness of an actual obstacle.

On the basis of the above research ideas, the inventor conducted a further study and proposed an anti-pinch detection method that meets S5 regulations and has a better detection effect. The method is suitable for a scenario that an anti-pinch detection needs to be performed on a closure component. The method is applicable to a controller for controlling a closable component. The anti-pinch detection method satisfying S5 regulations according to the present disclosure is described below through the following embodiments.

Figure 3:
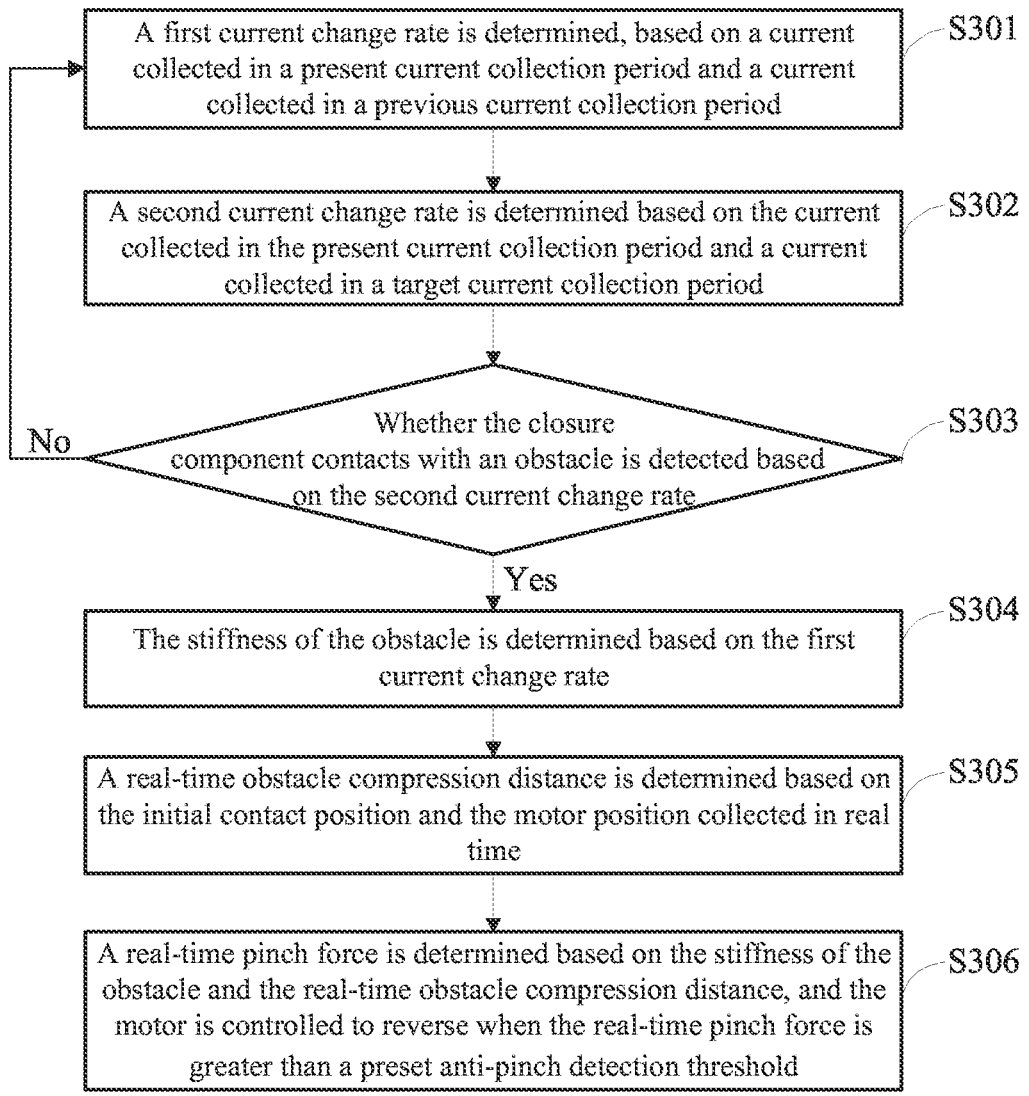
FIG. 3 is a schematic flowchart of an anti-pinch detection method according to an embodiment of the present disclosure.

FIG. 3 shows a schematic flowchart of an anti-pinch detection method that meets S5 regulations according to an embodiment of the present disclosure. The method may include steps S301 to S306.

In step S301, a first current change rate is determined, based on a current collected in a present current collection period and a current collected in a previous current collection period.

In this embodiment, the current of a motor is periodically collected in a process of controlling an operation of the motor to drive a closure component to close.

The closure component may be, but is not limited to, a movable component of a vehicle, such as a door, a window, a sunroof; a rearview mirror, and a seat. In an embodiment, the current of the motor is collected through a sampling resistor and a differential amplifier in an operation process of the motor.

Assuming that the current collected in a present current collection period is represented as I(k), and the current collected in a previous current collection period is represented as I(k−1). Thus, the first current change rate $\Delta I_1(k)$ may be determined based on the current I(k) collected in the present current collection period and the current I(k−1) collected in the previous current collection period by: calculating a difference of the current I(k) collected in the present current collection period and the current I(k−1) collected in the previous current collection period as the first current change rate $\Delta I_1(k)$, that is:

$$\Delta I_1(k) = I(k) - I(k-1). \tag{1}$$

In step S302, a second current change rate is determined based on the current collected in the present current collection period and a current collected in a target current collection period.

There are N current collection periods between the target current collection period and the present current collection period, where N is an integer greater than or equal to 2. For example, N may be 3 or 4.

There are various ways to determine the second current change rate based on the current collected in the present current collection period and the current collected in the target current collection period. It is assumed that the current collected in the present current collection period is represented as I(k), and the current collected in the target current collection period is represented as I(k−N). In a possible implementation, the second current change rate $\Delta I_2$ is calculated as a difference between the current I(k) collected in the present current collection period and the current I(k−N) collected in the target current collection period, by the expression $$\Delta I_2 = I(k) - I(k-N). \tag{2}$$

In the operation process of the motor, an alternating current ripple noise may be superimposed on a direct current component. In another better implementation, in order to avoid influence from the noise, the second current change rate $\Delta I_2$ may be calculated as a difference between a filtered value If(k) of the current collected in the present current collection period and a filtered value If(k−N) of the current collected in the target current collection period:

$$\Delta I_2 = If(k) - If(k-N). \tag{3}$$

The filtered value If(k) of the current collected in the present current collection period is obtained by filtering the current I(k) collected in the present current collection period, and the filtered value If(k−N) of the current collected in the target current collection period is obtained by filtering the current I(k−N) collected in the target current collection period.

In an embodiment, a first-order sliding filter may be applied to filter the current I(k) collected in the present current collection period and the current I(k−N) collected in the target current collection period. A calculation for filtering the current I(k) by the first-order sliding filter is expressed as:

$$If(k) = K1 * If(k-1) + K2 * I(k). \qquad (4)$$

In the expression (4), If(k−1) represents a filtered current at a previous moment, and K1 and K2 are weighting coefficients.

In step S303, it is detected, based on the second current change rate, whether the closure component contacts with an obstacle. If it is detected that the closure component contacts with the obstacle, the method proceeds to step S304; and if it is not detected that the closure component contacts with the obstacle, the method returns to step S301.

Whether the closure component contacts with the obstacle may be detected based on the second current change rate by: detecting an initial contact position based on the second current change rate; and determining that the closure component contacts with the obstacle when the initial contact position is detected.

The initial contact position indicates a position where the closure component to contacts with the obstacle. A specific implementation of detecting the initial contact position based on the second current change rate can refer to description of subsequent embodiments.

In step S304, the stiffness of the obstacle is determined based on the first current change rate.

it should be noted that a core of the anti-pinch detection satisfying S5 regulations is to distinguish obstacles with different stiffness, such as a 65 N/mm spring and a 20 N/mm spring, so as to select different anti-pinch detection thresholds and obstacle stiffness with respect to obstacles with different stiffness, and thereby achieve consistency in measuring forces for different obstacle stiffness. Taking the 65 N/mm spring and the 20 N/mm spring as an example, if an anti-pinch detection threshold and spring stiffness corresponding to the 65 N/mm spring are uniformly applied, the detection method may be too sensitive when using the 20 N/mm spring and therefore cause a false detection; and if an anti-pinch detection threshold and spring stiffness corresponding to the 20 N/mm spring are uniformly applied, the pinch force may be too large when using the 65 N/mm spring.

It may be understood that the magnitude of the current in the operation process of the motor reflects the load on the motor, and a change of the current reflects a change of resisting force. In view of this, in the present disclosure, stiffness of obstacles, such as stiffness of the 65 N/mm spring and stiffness of the 20 N/mm spring, is distinguished by using the first current change rate.

Figure 4:
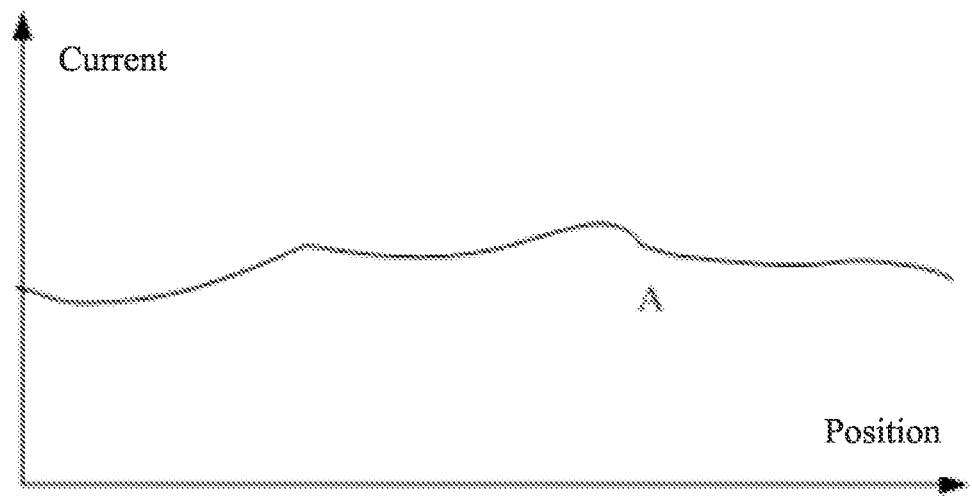
FIG. 4 is a schematic diagram showing a resistance characteristic curve for an operation of a motor according to an embodiment of the present disclosure.

FIG. 4 shows a resistance characteristic curve, i.e., a current characteristic curve, of an operation of a motor when the closure component does not contact with any obstacle. Since guide rails of the closure components have different resisting force, the current change rates at different positions are different. Under a condition that the closure component does not contact with any obstacle, the first current change rates are determined at different motor positions and stored in a nonvolatile storage unit (such as an Electrically Erasable Programmable read only memory (EEPROM)) of the controller for subsequent reference.

Figure 5:
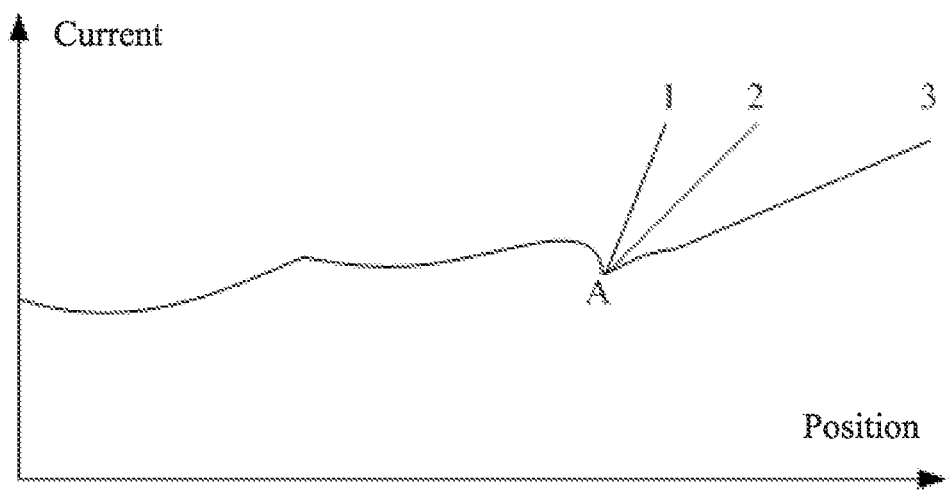
FIG. 5 is a schematic diagram of a resistance characteristic curve when a closure component contacts with an obstacle according to an embodiment of the present disclosure.

FIG. 5 shows a resistance characteristic curve when the closure component contacts with an obstacle. Referring to FIG. 5, the closure component contacts with the obstacle at a point A on the curve, and the resisting force of the motor rises and the current increases since the point A. In this embodiment, the stiffness of the obstacle is determined based on the first current change rate when the closure component is detected to contact with the obstacle.

Specifically, the stiffness of the obstacle may be determined, based on the first current change rate and a calibrated first current change rate tor a motor position collected at present under the condition that the closure component does not contact with any obstacle, expressed as:

$$Ko = Kv * Kt(\Delta I_1(k) - \Delta I_1 r(k)). \qquad (5)$$

In the expression (5), Ko represents the stiffness of the obstacle; $\Delta I_1(k)$ represents the first current change rate; $\Delta I_1 r(k)$ represents the calibrated first current change rate for a motor position collected at present under the condition that the closure component does not contact with any obstacle, the value of which may be obtained from the EEPROM; and Kv*Kt is a preset parameter calibrated on a bench.

It should be noted that a purpose of introducing the calibrated first current change rate $\Delta I_1 r(k)$ for the motor position collected at present under the condition that the closure component does not contact with any obstacle is to avoid false detection due to changes in the resistance characteristic in the case of no obstacle.

It should be noted that when the closure component contacts with the obstacle, the greater the stiffness of the obstacle, the greater the first current change rate. Therefore, the stiffness of the obstacle may be classified according to different current change rates. "1", "2", and "3" in FIG. 5 represent changing trends of the motor current for three obstacles with different stiffness, respectively. Apparently, values of the stiffness have a relationship of

1>2>3.

In step S305, a real-time obstacle compression distance is determined based on the initial contact position and the motor position collected in real time.

Specifically, the real-time obstacle compression distance is a difference between the motor position collected in real time and the initial contact position. The initial contact position is determined based on the motor position collected when the closure component contacts with the obstacle, in step S306, a real-time pinch force is determined based on the stiffness of the obstacle and the real-time obstacle compression distance, and the motor is controlled to reverse when the real-time pinch force is greater than a preset anti-pinch detection threshold.

The anti-pinch detection threshold is determined based on the stiffness of the obstacle.

Figure 6:
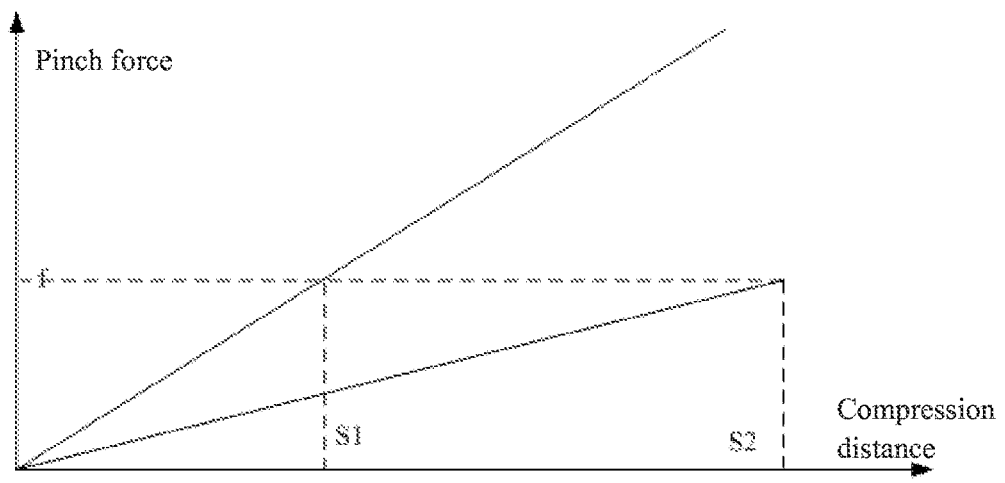
FIG. 6 is a schematic diagram showing relationships between pinch forces and compression distances for objects with different stiffness according to an embodiment of the present disclosure.

FIG. 6 shows relationships between pinch forces and obstacle compression distances for obstacles with different stiffness. Referring to FIG. 6, it is assumed that there are two obstacles a1 with a stiffness Ko1 and a2 with a stiffness Ko2, where Ko1>Ko2. It is necessary to control the obstacle compression distance S1 corresponding to the obstacle a1 to be less than the obstacle compression distance S2 corresponding to the obstacle a2, so as to ensure the same pinch force f. In other words, in the case of the same pinch force, a short obstacle compression distance should be selected for the obstacle with a high stiffness, and a long obstacle compression distance should be selected for the obstacle with a low stiffness. Therefore, in addition to distinguishing stiffness of different obstacles, it is further necessary to determine the obstacle compression distances of the different obstacles, so as to achieve a consistency of the pinch forces of objects with different stiffness.

After the obstacle stiffness and the real-time obstacle compression distance are obtained, the real-time pinch force may be calculated based on the obstacle stiffness and the real-time obstacle compression distance. Compared with the speed-based anti-pinch detection method, the magnitude of the pinch force can be intuitively reflected based on the method according to the embodiments.

According to Hooke's law, for an object with uniform stiffness, the received force is in a first-order linear relationship with a compression degree of the object. The obstacle may be regarded approximately as an object with uniform stiffness within a short time period when the closure component resists pinching and reverses. Therefore, there is an expression:

$$F(k) = Ko * \Delta S(k) \tag{6}$$

In the expression (6), $\Delta S(k)$ represents the obstacle compression distance at a. moment k, Ko represents the stiffness of the obstacle, and F(k) represents the pinch three at the moment k.

it should be noted that a condition of an anti-pinch reversal is $F(k)=Ko*\Delta S(k)<100N$, and therefore the obstacle compression distance should satisfy $\Delta S(k)<1.00$ N/Ko.

After the real-time pinch force F(k) is obtained, it is determined whether the real-time pinch force F(k) is greater than a preset anti-pinch detection threshold F_THR. The threshold is selected based on the determined Ko. If the real-time pinch force F(k) is greater than the preset anti-pinch detection threshold F_THR, it is determined that an anti-pinch event occurs, and the motor is controlled to reverse at this time.

Figure 7:
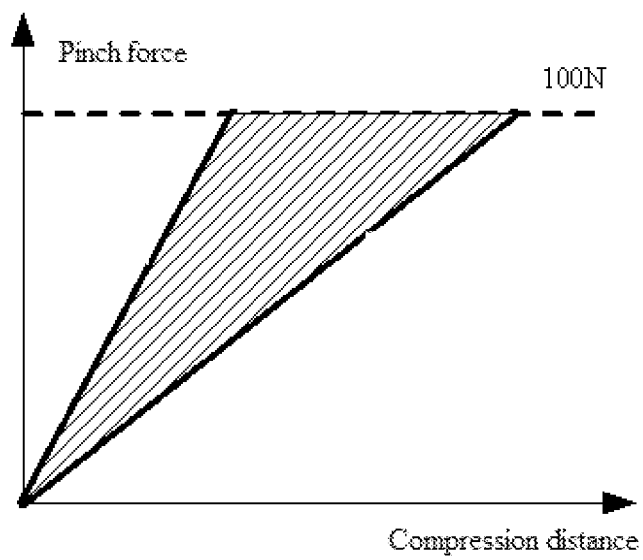
FIG. 7 is a schematic diagram showing stiffness boundary of a detectable object according to an embodiment of the present disclosure.

In an application, the stiffness and the anti-pinch detection threshold corresponding to an identifiable object with hardest stiffness, and the stiffness and the anti-pinch detection threshold corresponding to an identifiable object with softest stiffness, respectively, may be obtained by calibration. Referring to FIG. 7, the two solid lines in FIG. 7 respectively show a relationship between the obstacle compression distance and the pinch force for an obstacle with a stiffness of Ko1, and a relationship between the obstacle compression distance and the pinch force for an obstacle with a stiffness of Ko2. The dashed line at the top of FIG. 7 indicates a boundary of a 100N pinch force. Therefore, the obstacle state within the shaded area indicates that for an object with stiffness in a range of Ko1 to Ko2, the pinch force is less than 100N.

In the anti-pinch detection method satisfying S5 regulations according to the embodiments of the present disclosure, in a process of the motor operating to drive a closure component to close, a first current change rate is determined based on a current collected in a present current collection period and a current collected in a previous current collection period; a second current change rate is determined based on the current collected in the present current collection period and a current collected in a target current collection period. Then, it is detected, based on the second current change rate, whether the closure component contacts with an obstacle. A stiffness of the obstacle is determined based on the first current change rate when the closure component is detected to contact with the obstacle. A real-time obstacle compression distance is determined based on an initial contact position and a motor position collected in real time. Finally, a real-time pinch three is determined based on the stiffness of the obstacle and the real-time obstacle compression distance, and the motor is controlled to reverse when the real-time pinch force is greater than a preset anti-pinch detection threshold. With the anti-pinch detection method provided in the present disclosure, the obstacle is quickly and accurately detected based on the second current change rate; and the stiffness of the obstacle is determined based on the first current change rate, so that different stiffness values of the obstacles may be obtained for obstacles with different stiffness, and different anti-pinch detection thresholds may be selected based on the different stiffness values of the obstacles. In this way, consistency of measuring forces can be ensured, thus avoiding false anti-pinch detection due to applying a small anti-pinch detection threshold. In summary, the anti-pinch detection method provided in the embodiments of the present disclosure satisfies S5 regulations, has a fast detection speed and a good detection effect, and can avoid false anti-pinch.

As mentioned in the above embodiment, the motor is controlled to reverse when the real-time pinch force is greater than the preset anti-pinch detection threshold. It may be understood that the closure component may move forward for a certain distance due to inertia before the motor reverses. In this process, the spring may be continually compressed, and thus the pinch force will be increased. For this reason, in the process of controlling the operation of the motor to drive the closure component to close according to the embodiment of the present disclosure, the motor is controlled to operate at a motor speed corresponding to the region where the closure component is located. In this embodiment, the operation of the motor may be controlled through a closed-loop control manner based on pulse width modulation (PWM)).

A movable region of the closure component in a closing direction includes multiple regions that do not overlap each other. Each of the regions corresponds to a set motor speed, and different regions correspond to different motor speeds. The region close to a terminal of the movement region in the closing direction corresponds to a small motor speed than a region away from the terminal.

Figures 8A, 8B:
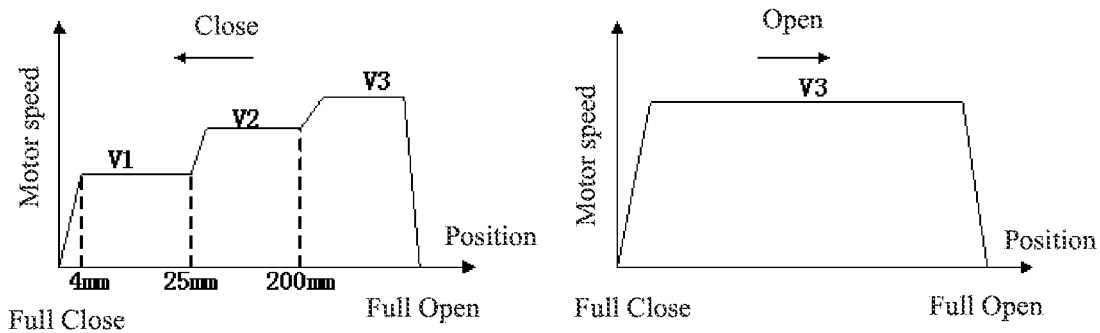
FIG. 8a is a schematic diagram showing a closed-loop control of motor speed for different regions by pulse width modulation according to regions in a process of closing a sunroof according to an embodiment of the present disclosure.
FIG. 8b is a schematic diagram showing a control of motor speed in a process of opening the sunroof according to an embodiment of the present disclosure.

Taking a sunroof of a vehicle as an example, the movable region of the sunroof in the closing direction is divided into multiple regions, such as regions that are from 4 mm to 25 mm, from 25 mm to 200 mm, and 200 mm away. It should be noted that the 4 mm, 25 mm, and 200 mm indicate distances to the terminal of the movement region in the closing direction, respectively. A motor speed is set for each of the regions. For example, the region from 4 mm to 25 mm corresponds to a motor speed $V_1$, the region from 25 mm to 200 mm corresponds a motor speed $V_2$, and the region 200 mm away corresponds to a motor speed $V_3$, where $V_3>V_2>V_1$. In other words, the region closer to the terminal of the movement region in the closing direction corresponds to a lower motor speed. The motor is controlled to operate at a speed corresponding to the region where the sunroof is located. Reference is made to FIG. 8a, which shows a schematic diagram of controlling the motor speed according to different regions in a process of closing a sunroof It should be noted that the motor speed may not be differentiated in the process of opening the closure component. For example, for the mentioned sunroof, the motor may be controlled to operate at a speed $V_3$, as shown in FIG. 8b.

In a preferred embodiment, when it is detected that the real-time pinch force is greater than the preset anti-pinch detection threshold, the motor may be controlled to reverse by applying a PWM full duty ratio, so as to achieve a shortest braking distance of the motor and reduce the forward distance.

In the embodiment of the present disclosure, the motor speed is controlled according to regions, and thus the forward distance can be reduced when the motor is turned off.

As mentioned above, the initial contact position may be detected based on the second current change rate. It is determined that the closure component contacts with an obstacle when the initial contact position is detected. An implementation of detecting the initial contact position based on the second current change rate will be described in the following.

There are various ways to detect the initial contact position based on the second current change rate.

In a possible implementation, it may be determined whether the second current change rate $\Delta I_2$ is greater than a preset first threshold $\Delta I_1\_THR$. If the second current change rate $\Delta I_2$ is greater than a preset first threshold $\Delta I_1\_THR$, a motor position collected by a position collecting unit at present is acquired as the initial contact position. In an embodiment, the position collecting unit may be a Hall sensor, and position information of the Hall sensor at present may be acquired as the initial contact position.

Figure 9:
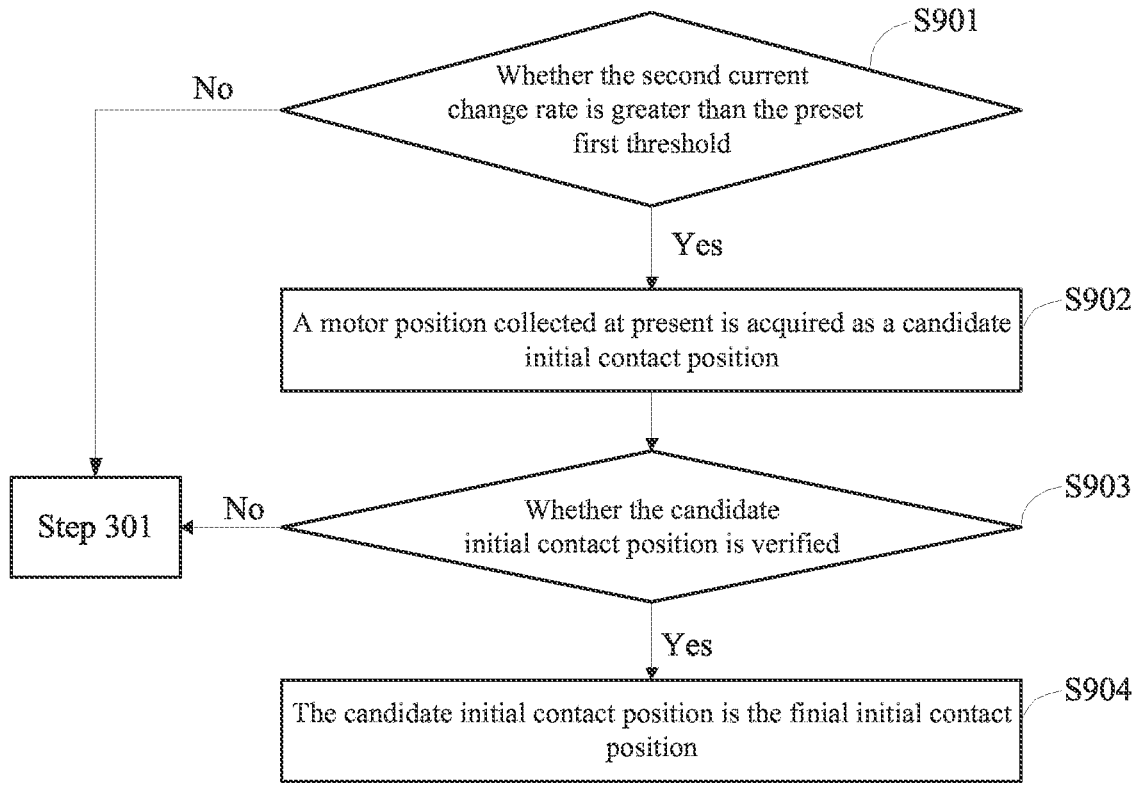
FIG. 9 is a schematic flowchart of an implementation for detecting an initial contact position based on a real-time second current change rate according to an embodiment of the present disclosure.

It should be noted that a too early selection of the initial contact position may cause the pinch force to be too small, and a too late selection of the initial contact position may cause the pinch force to be too large. Theoretically, the motor position collected by the position collecting unit when $\Delta I_2 > \Delta I_1\_THR$ is the initial contact position. However, considering that the second current change rate fluctuates with changes in the resisting force of a sliding rail, the determined initial contact position may be wrong. In view of this, a preferable implantation is further provided in another embodiment. FIG. 9 shows a schematic flowchart of such implementation, which may include steps S901 to S904.

In step S901, it is determined whether the second current change rate $\Delta I_2$ is greater than the preset first threshold $\Delta I_1\_THR$. Step S902 is performed if the second current change rate is greater than the first threshold $\Delta I_1\_THR$; otherwise, step S301 is performed, that is, the anti-pinch detection method is perform again.

The first threshold $\Delta I_1\_THR$ is obtained through calibration.

In step S902, a motor position collected at present is acquired as a candidate initial contact position.

In this embodiment, the motor position collected by the position collecting unit at present may be acquired as the candidate initial contact position. In an embodiment, the position collecting unit may be a Hall sensor, and position information of the Hall sensor at present may be acquired as the initial contact position.

In step S903, it is determined whether the candidate initial contact position is verified. Step S904 is performed if the candidate initial contact position is verified. If the candidate initial contact position is not verified, step S301 is performed, that is, the anti-pinch detection method is performed again.

The determining whether the candidate initial contact position is verified refers to determining whether the candidate initial contact position is a correct initial contact position. If the candidate initial contact position is verified, it indicates that the candidate initial contact position is the correct initial contact position. If the candidate initial contact position is not verified, it indicates that the candidate initial contact position is not the correct initial contact position.

As mentioned above, the position information of the Hall sensor may be regarded as the candidate initial position. If it is determined that the candidate initial contact position is not the correct initial contact position, the previously accumulated position count of the Hall sensor needs to be cleared to zero.

In a possible implementation, the process of determining whether the candidate initial contact position is verified may include: at each time the current of the motor is collected after the candidate initial contact position is obtained, determining whether the candidate initial contact position is verified, based on the second current change rate determined in real time, and/or based on a third current change rate determined in real time and the third current change rate determined previously.

There are various implementations to determine, at each time the current of the motor is collected, the third current change rate based on the collected current and the current corresponding to the candidate initial contact position. In a possible implementation, the third current change rate $\Delta I_3$ may be calculated as a difference between the collected current $I(k)$ and the current $I_0$ corresponding to the candidate initial contact position, by the following expression:

$$\Delta I_3 = I(k) - I_0. \quad (7)$$

In another possible implementation, the third current change rate may be calculated as a difference between a filtered value $If(k)$ of the collected current $I(k)$ and a filtered value $If_0$ of the current $I_0$ corresponding to the candidate initial contact position, by the following expression:

$$\Delta I_3 = If(k) - If_0. \quad (8)$$

Further, a process of determining whether the candidate initial contact position is verified based on the second current change rate determined in real time, and/or based on a third current change rate determined in real time and the third current change rate determined previously may include: determining that the candidate initial contact position is not verified if at least one of a first situation and a second situation appears after the candidate initial contact position is obtained; and determining that the candidate initial contact position is verified if none of the first situation and the second situation appears after the candidate initial contact position is obtained.

The first situation is that the second current change rate determined in real time is less than a preset second threshold. The second situation is that a case where the third current change rate determined in real time and the third current change rate determined previously are greater than a preset third threshold successively occurs and a duration of the case that the third current change rate is greater than the third threshold is greater than a preset period.

The second threshold and the third threshold are both fixed values, which may be empirical values obtained through multiple experiments.

In step S904, the candidate initial contact position is determined as the initial contact position.

According to the embodiments of the present disclosure, the initial contact position may be detected quickly and accurately based on the second current change rate.

After the initial contact position is determined, a real-time obstacle compression distance ΔS may be calculated based on the initial contact position. The real-time obstacle compression distance ΔS is a difference between a motor position S(k) collected in real time and the initial contact position $S_0$, which is expressed as:

$$\Delta S = S(k) - S_0. \quad (9)$$

In the expression (9), the motor position S(k) collected in real time may be position information of a Hall sensor at present. The obstacle compression distance AS may be accurately determined based on the position information of the Hall sensor.

An anti-pinch detection device is further provided according to an embodiment of the present disclosure, which is described as below. The anti-pinch detection device described below may refer to the anti-pinch detection method described above.

Figure 10:
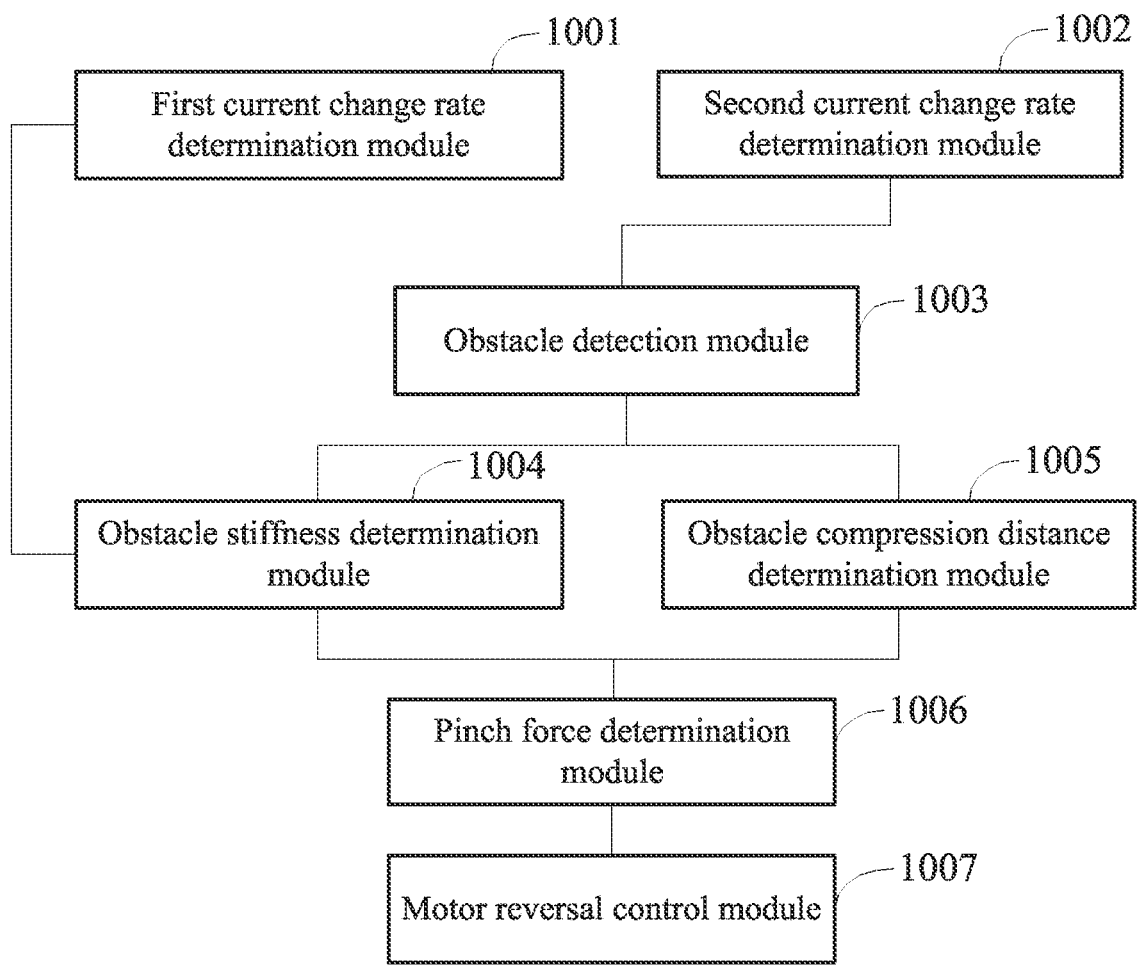
FIG. 10 is a schematic structural diagram of an anti-pinch detection device satisfying S5 regulations according to an embodiment of the present disclosure.

FIG. 10 shows a schematic structural diagram of an anti-pinch detection device that meets S5 regulations according to an embodiment of the present disclosure. Referring to FIG. 10, the anti-pinch detection device satisfying S5 regulations may include: a first current change rate determination module 1001, a second current change rate determination module 1002, an obstacle detection module 1003, an obstacle stiffness determination module 1004, an obstacle compression distance determination module 1005, a pinch force determination module 1006, and a motor reversal control module 1007.

The first current change rate determination module 1001 is configured to determine a first current change rate based on a current collected in a present current collection period and a current collected in a previous current collection period.

The current of a motor is periodically collected in a process of controlling an operation of the motor to drive a closure component to close.

The second current change rate determination module 1002 is configured to determine a second current change rate based on the current collected in the present current collection period and a current collected in a target current collection period.

There are N current collection periods between the target current collection period and the present current collection period, where N is an integer greater than or equal to 2.

The obstacle detection module 1003 is configured to detect, based on the second current change rate, whether the closure component contacts with an obstacle.

The obstacle stiffness determination module 1004 is configured to determine a stiffness of the obstacle based on the first current change rate if the closure component is detected to contact with the obstacle.

The obstacle compression distance determination module 1005 is configured to determine a real-time obstacle compression distance based on an initial contact position and a motor position collected in real time.

The initial contact position is determined based on a motor position collected when the closure component is detected to contact with the obstacle.

The pinch force determination module, 1006 is configured to determine a real-time pinch force based on the stiffness of the obstacle and the real-time obstacle compression distance.

The motor reversal control module 1007 is configured to control the motor to reverse in a case where the real-time pinch force is greater than a preset anti-pinch detection threshold.

The anti-pinch detection threshold is determined based on the stiffness of the obstacle.

With the anti-pinch detection device provided in the present disclosure, the obstacle is quickly and accurately detected based on the second current change rate; and the stiffness of the obstacle is determined based on the first current change rate, so that different stiffness values of obstacle may be obtained for obstacles with different stiffness, and different anti-pinch detection thresholds may be selected based on the different stiffness values of the obstacle. In this way, consistency of measuring threes can be ensured, thus avoiding false anti-pinch detection due to applying a single small anti-pinch detection threshold. In summary, the anti-pinch detection method provided in the embodiments of the present disclosure satisfies S5 regulations, has a fast detection speed and a good detection effect, and can avoid false anti-pinch.

In a possible implementation, the second current change rate determination module 1002 in the anti-pinch detection device provided in the embodiment is specifically configured to calculate the second current change rate as a difference between the current collected in the present current collection period and the current collected in the target current collection period; or calculate the second current change rate as a difference between a value obtained by filtering the current collected in the present current collection period and a value obtained by filtering the current collected in the target current collection period.

In a possible implementation, the obstacle detection module 1003 in the anti-pinch detection device provided in the embodiment may include an initial contact position detection module and an obstacle determination module.

The initial contact position detection module is configured to detect the initial contact position based on the second current change rate. The initial contact position is a position point at which the closure component starts to contact with the obstacle.

The obstacle determination module is configured to determine that the closure component contacts with the obstacle when the initial contact position is detected.

In a possible implementation, the initial contact position detection module is specifically configured to: acquire a motor position collected at present as a candidate initial contact position, when the second current change rate is greater than a preset first threshold; determine whether the candidate initial contact position is verified; use the candidate initial contact position as the initial contact position if the candidate initial contact position is verified; and if the candidate initial contact position is not verified, activate the first current change rate determination module 1001 to determine a first current change rate based on the current collected in the present current collection period and the current collected in the previous current collection period, and activate the second current change rate determination module 1002 to determine a second current change rate based on the current collected in the present current collection period and the current collected in the target current collection period.

In a possible implementation, the initial contact position detection module is specifically configured to after the candidate initial contact position is obtained, each time the current of the motor is collected, determine whether the candidate initial contact position is to verified, based on the second current change rate determined in real time, and/or based on a third current change rate determined in real time and a third current change rate determined previously.

Each time the current of the motor is collected, the third current change rate is determined in real time based on the collected current and the current corresponding to the candidate initial contact position.

In a possible implementation manner, when the initial contact position detection module determines that the candidate initial contact position is verified based on the second current change rate determined in real time and/or based on the third current change rate determined in real time and the third current change rate determined previously, the initial contact position detection module is specifically configured to: determine that the candidate initial contact position is not verified if at least one of a first situation and a second situation occurs after the candidate initial contact position is obtained; and determine that the candidate initial contact position is verified if none of the first situation and the second situation occurs after the candidate initial contact position is obtained.

The first situation is that the second current change rate determined in real time is less than a preset second threshold.

The second situation is that a case where the third current change rate determined in real time and the third current change rate determined previously are greater than a preset third threshold successively occurs, and a duration of the case that the third current change rate is greater than the third threshold is greater than a preset period.

In a possible implementation, the obstacle stiffness determination module 1004 in the anti-pinch detection device provided in the foregoing embodiment is specifically configured to determine the stiffness of the obstacle based on the first current change rate and a first current change rate calibrated for a motor position collected under a condition that the closure component does not contact with any obstacle.

In a possible implementation, the anti-pinch detection device provided in the foregoing embodiment further includes a speed control module.

The speed control module is configured to control the motor to operate at a motor speed corresponding to a region where the closure component is located, in the process of controlling the operation of the motor to drive the closure component to close.

A movement region of the closure component in a closing direction includes multiple regions that do not overlap each other. Each of the regions corresponds to a set motor speed, and different regions correspond to different motor speeds. The region close to a terminal of the movement region in the closing direction corresponds to a smaller motor speed than a region away from the terminal.

Figure 11:
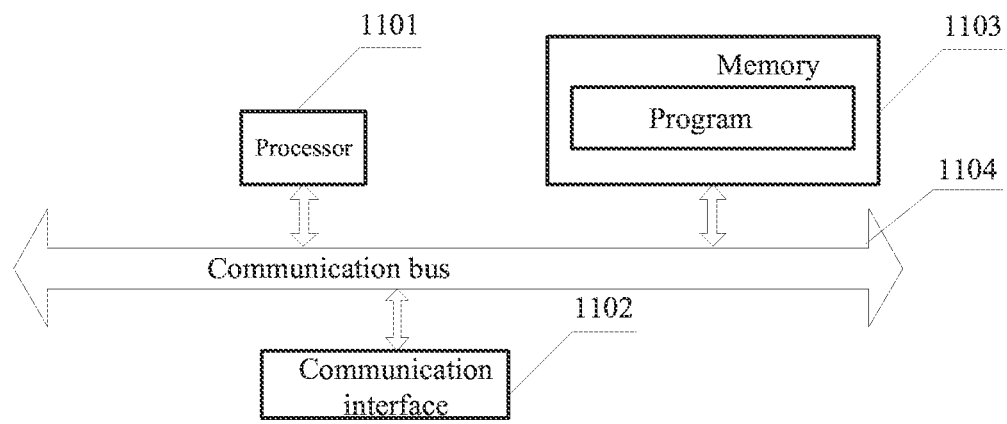
FIG. 11 is a schematic structural diagram of a controller according to an embodiment of the present disclosure.

A controller is further provided according to an embodiment of the present disclosure. FIG. 11 shows a schematic structural diagram of the controller. Referring to FIG. 11, the controller may include at least one processor 1101, at least one communication interface 1102, at least one memory 1103, and at least one communication bus 1104.

In an embodiment of the present disclosure, the number of processor 1101, the number of communication interface 1102, the number of memory 1103, and the number of communication bus 1104 is all at least one. The processor 1101, the communication interface 1102, and the memory 1103 communicate with each other via the communication bus 1104.

The processor 1101 may be a central processing unit CPU, an Application Specific Integrated Circuit (ASIC), or one or more integrated circuits configured to implement the embodiments of the present disclosure.

The memory 1103 may include a high-speed RAM memory, and may further include a non-volatile memory, such as at least one disk memory.

The memory stores a program which may be invoked by a processor. The program is configured for:

determining a first current change rate based on a current collected in a present current collection period and a current collected in a previous current collection period, where the current of a motor is periodically collected in a process of controlling an operation of the motor to drive a closure component to close;

determining a second current change rate based on the current collected in a present current collection period and a current collected in a target current collection period, where there are N current collection periods between the target current collection period and the present current collection period, where N is an integer greater than or equal to 2;

detecting, based on the second current change rate, whether the closure component to contacts with an obstacle;

determining a stiffness of the obstacle based on the first current change rate. in a case where the closure component is detected to contact with the obstacle;

determining a real-time obstacle compression distance based on an initial contact position and a motor position collected in real time, where the initial contact position is determined based on a motor position collected when the closure component is detected to contact with the obstacle; and determining a real-time pinch force based on the stiffness of the obstacle and the real-time obstacle compression distance, and controlling the motor to reverse in a case where the real-time pinch force is greater than a preset anti-pinch detection threshold, where the anti-pinch detection threshold is determined based on the stiffness of the obstacle.

In other embodiments, the descriptions for detailed functions and extended functions of the program can refer to the above embodiments.

A readable storage medium is further provided according to an embodiment of the present disclosure. The readable storage medium may store a program executable by a processor. The program is configured for:

determining a first current change rate based on a current collected in a present current collection period and a current collected in a previous current collection period, where the current of a motor is periodically collected in a process of controlling an operation of the motor to drive a closure component to close;

determining a second current change rate based on the current collected in a present current collection period and a current collected in a target current collection period, where there are N current collection periods between the target current collection period and the present current collection period, where N is an integer greater than or equal to 2;

detecting, based on the second current change rate, whether the closure component contacts with an obstacle;

determining a stiffness of the obstacle based on the first current change rate in a case where the closure component is detected to contact with the obstacle;

determining a real-time obstacle compression distance based on an initial contact position and a motor position collected in real time, where the initial contact position is determined based on a motor position collected when the closure component is detected to contact with the obstacle; and determining a real-time pinch force based on the stiffness of the obstacle and the real-time obstacle compression distance, and controlling the motor to reverse in a case where the real-time pinch force is greater than a preset anti-pinch detection threshold, where the anti-pinch detection threshold is determined based on the stiffness of the obstacle.

In other embodiments, the description for detailed functions and extended functions of the program can refer to the above embodiments.

Figure 12:
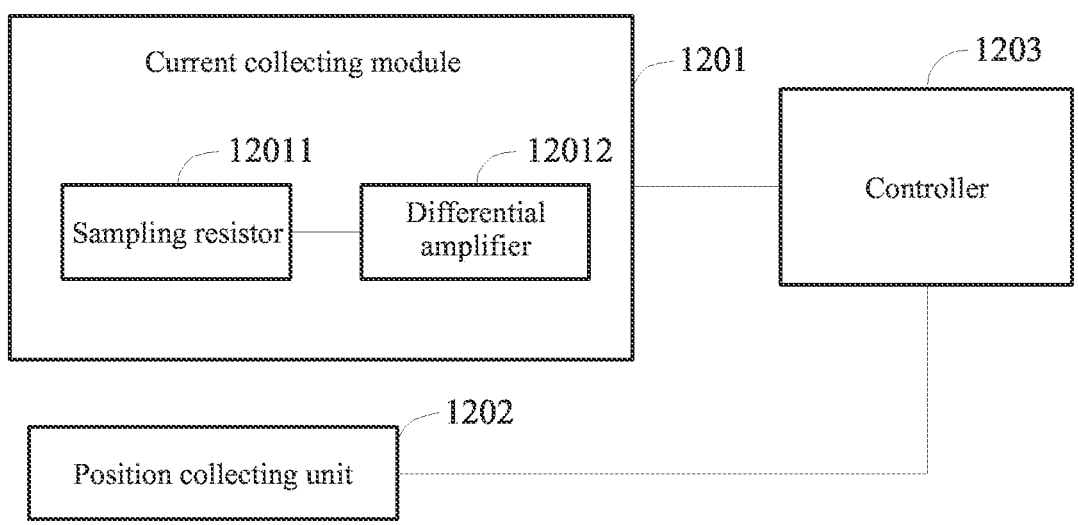
FIG. 12 is a schematic structural diagram of an anti-pinch detection system satisfying S5 regulations according to an embodiment of the present disclosure.

An anti-pinch detection system is further provided according to an embodiment of the present disclosure. FIG. 12 shows a schematic structural diagram of the anti-pinch detection system. Referring to FIG. 12, the system may include a current collecting unit 1201, a position collecting unit 1202, and a controller 1203.

The controller 1203 is configured to: in a process of controlling an operation of the motor to drive a closure component to close, control the current collecting unit 1201 to collect a current of a motor according to a preset current collection period; control the position collecting unit 1202 to collect a motor position in real time; determine a first current change rate based on a current collected in a present current collection period and a current collected in a previous current collection period; determine a second current change rate based on the current collected in the present current collection period and a current collected in a target current collection period; detect, based on the second current change rate, whether the closure component contacts with an obstacle; determine a stiffness of the obstacle based on the first current change rate in a case where the closure component is detected to contact with the obstacle; determine a real-time obstacle compression distance based on an initial contact position and the motor position collected in real time; and determine a real-time pinch force based on the stiffness of the obstacle and the real-time obstacle compression distance, and control the motor to reverse in a case where the real-time pinch force is greater than a preset anti-pinch detection threshold.

There are N current collection periods between the target current collection period and the present current collection period, where N is an integer greater than or equal to 2. The initial contact position is determined based on the motor position collected by the position collecting unit 1202 when the closure component is detected to contact with the obstacle. The anti-pinch detection threshold is determined based on the stiffness of the obstacle.

In a preferred embodiment, the current collecting unit 1201 includes a sampling resistor 12011 and a differential amplifier 12012, as shown in FIG. 12.

The sampling resistor 12011 is configured to convert the current in an operation process of the motor into a voltage signal. The differential amplifier 12012 is configured to amplify the voltage signal to obtain an amplified voltage signal. The controller 1203 is specifically configured to collect, based on the amplified voltage signal, the current of the motor according to a preset current collection period.

Figure 13:
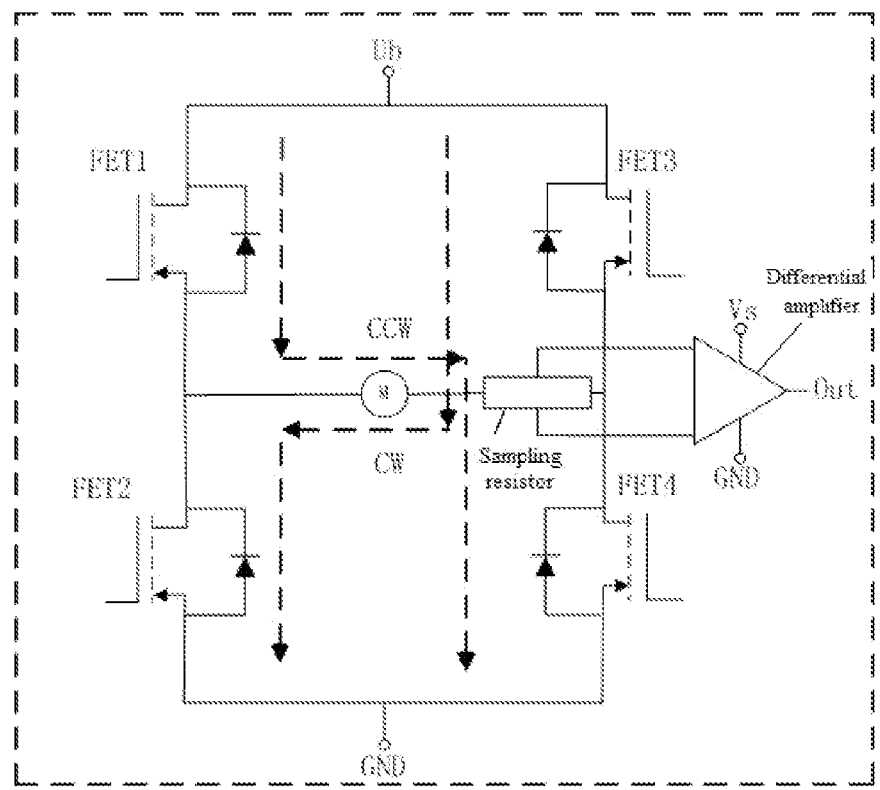
FIG. 13 is a diagram showing a principle of a motor control and a current collection according to an embodiment of the present disclosure.

FIG. 13 shows a principle diagram for a motor control and a current collection. An H bridge, a sampling resistor, and a differential amplifier are shown in FIG. 13. The sampling resistor is arranged in the middle of the H bridge. In FIG. 13,
"Ub" represents a power supply voltage, which may be 12V. "GND" represents a ground terminal. "Vs" represents a working voltage of the differential amplifier, which may be 5V. "Out" represents an output of the differential amplifier. The sampling resistor converts the current in an operation process of the motor into a voltage signal. The differential amplifier amplifies the voltage signal, and the controller 1203 collects a current of the motor based on the amplified voltage signal. It should be noted that the H bridge is a typical direct current motor control circuit, and is named "H bridge" since the shape of the circuit looks like a letter "H". As shown in FIG. 13, there are 4 triodes FET1, FET2, FET3, and FET4, which works as 4 vertical branches of "H", and a motor M works as a horizontal line of "H". CW indicates that the motor rotates clockwise (that is, forward rotation), and CCW indicates that the motor rotates counterclockwise (that is, reverse rotation). The triodes FET2 and FET3 are turned on when the motor M rotates forward. In this case, the current of the motor M when rotating forward may be collected using the sampling resistor and the differential amplifier. The triodes FET1 and FET4 are turned on when the motor M rotates reversely. In this case, the current of the motor M when rotating reversely may be collected using the sampling resistor and the differential amplifier. In this way, the currents of the motor when rotating forward and when rotating reversely may be collected using a single sampling resistor and a single operation amplifier, thereby saving hardware costs. In this embodiment, a voltage on an input terminal of the differential amplifier may be raised by 2.5V. The voltage on the input terminal of the differential amplifier is in a range from 2.5V to 5V when the motor rotates forward, and the voltage on the input terminal of the differential amplifier is in a range from 0V to 2.5V when the motor rotates reversely. The voltage is amplified and output to the controller 1203 to realize bidirectional current detection.

In an embodiment, the anti-pinch detection system according to the foregoing embodiment may further include a speed collecting unit.

The controller 1203 is further configured to control the motor to operate at a motor speed corresponding to a region where the closure component is located, in a process of controlling the operation of the motor to drive the closure component to close.

Specifically, the controller 1203 controls the speed collecting unit to collect a real-time motor speed; and adjusts the real-time motor speed to the motor speed correspond to the region where the closure component is located.

A movement region of the closure component in a closing direction includes multiple regions that do not overlap each other. Each of the regions corresponds to a set motor speed, and different regions correspond to different motor speeds. The region close to a terminal of the movement region in the closing direction corresponds to a smaller motor speed than a region away from the terminal.

In an embodiment, when a second current change rate is determined based on the current collected in the present current collection period and the current collected in the target current collection period, the controller 1203 is specifically configured to calculate a difference between the current collected in the present current collection period and the current collected in the target current collection period, as the second current change rate; or calculate a difference between a value obtained by filtering the current collected in the present current collection period and a value obtained by filtering the current collected in the target current collection period, as the second current change rate.

In an embodiment, when whether the closure component contacts with the obstacle is detected based on the second current change rate, the controller 1203 is specifically configured to: detect an initial contact position based on the second current change rate, where the initial contact position is a position point at which the closure component starts to contact with the obstacle; and determine that the closure component contacts with the obstacle when the initial contact position is detected.

In an embodiment, when the initial contact position is detected based on the second current change rate, the controller 1203 is specifically configured to: acquire, when the second current change rate is greater than a preset first threshold, a motor position collected at present as a candidate initial contact position; determine whether the candidate initial contact position is verified; take the candidate initial contact position as the initial contact position if the candidate initial contact position is verified; and if the candidate initial contact position is not verified, perform the step of determining the first current change rate based on the current collected in the present current collection period and the current collected in the previous current collection period, and perform the step of determining the second current change rate based on the current collected in the present current collection period and the current collected in the target current collection period.

In an embodiment, when whether the candidate initial contact position is verified is determined, the controller 1203 is specifically configured to: after the candidate initial contact position is obtained, each time the current of the motor is collected, determine whether the candidate initial contact position is verified, based on the second current change rate determined in real time, and/or based on a third current change rate determined in real time and a third current change rate determined previously. Each time the current of the motor is collected, the third current change rate is determined in real time based on the collected current and the current corresponding to the candidate initial contact position.

In an embodiment, when whether the candidate initial contact position is verified is determined based on the second current change rate determined in real time, and/or based on a third current change rate determined in real time and the third current change rate determined previously, the controller 1203 is specifically configured to: determine that the candidate initial contact position is not verified, if at least one of a first situation and a second situation occurs after the candidate initial contact position is obtained; and determine that the candidate initial contact position is verified, if none of the first situation and the second situation occurs after the candidate initial contact position is obtained.

The first situation is that the second current change rate determined in real time is less than a preset second threshold.

The second situation is that a case where the third current change rate determined in real time and the third current change rate determined previously are greater than a preset third threshold successively occurs and a duration of the case that the third current change rate is greater than the third threshold is greater than a preset period.

in an embodiment, when the stiffness of the obstacle is determined based on the first current change rate, the controller 1203 is specifically configured to: determine the stiffness of the obstacle based on the first current change rate and a first current change rate calibrated for a motor position collected under a condition that the closure component does not contact with any obstacle.

Finally, it should be noted that the relationship terms such as "first", "second" and the like are used herein merely to distinguish one entity or operation from another, rather than to necessitate or imply existence of the actual relationship or order of the entities or operations. Moreover, terms "include", "comprise" or any other variants thereof are intended to be non-exclusive. Therefore, a process, method, article or device including a series of elements includes not only these elements but also elements that are not enumerated, or elements that are inherent to the process, method, article or device. Unless expressively limited otherwise, a process, method, article or device limited by "comprising/including a(n) . . . " does not exclude existence of another identical element in such process, method, article or device.

The embodiments in this specification are described in a progressive manner. Each embodiment focuses on any difference from others, and the same or similar parts among the embodiments can be referred to each other.

Those skilled in the art can implement or practice the present disclosure based on the above description of the disclosed embodiments. Various modifications to these embodiments are obvious to those skilled in the art. The general principles defined in the present disclosure may be implemented in other embodiments without departing from the spirit and scope of the present disclosure. Therefore, the present disclosure should not be limited to the embodiments disclosed herein, but conforms to the widest scope consistent with the principle and novel features disclosed in the specification.

The invention claimed is:

1. An anti-pinch detection method, comprising:
determining a first current change rate based on a current collected in a present current collection period and a current collected in a previous current collection period, wherein the previous current collection period is a current collection period before the present current collection period and immediately adjacent to the present current collection period, wherein the current of a motor is periodically collected in a process of controlling an operation of the motor to drive a closure component to close;
determining a second current change rate based on the current collected in the present current collection period and a current collected in a target current collection period, wherein the target current collection period is a current collection period before the present current collection period and there are N current collection periods between the target current collection period and the present current collection period, wherein N is an integer greater than or equal to 2;
detecting whether the closure component contacts with an obstacle, based on the second current change rate;
determining a stiffness of the obstacle based on the first current change rate, in a case where the closure component is detected to contact with the obstacle;
determining a real-time obstacle compression distance based on an initial contact position and a motor position collected in real time, wherein the initial contact position is determined based on a motor position collected when the closure component is detected to contact with the obstacle; and
determining a real-time pinch force based on the stiffness of the obstacle and the real-time obstacle compression distance, and controlling the motor to reverse in a case where the real-time pinch force is greater than a preset anti-pinch detection threshold, wherein the anti-pinch detection threshold is determined based on the stiffness of the obstacle.

2. The anti-pinch detection method according to claim 1, wherein the determining a second current change rate based on the current collected in the present current collection period and a current collected in a target current collection period comprises:
calculating a difference between the current collected in the present current collection period and the current collected in the target current collection period, as the second current change rate; or
calculating a difference between a value obtained by filtering the current collected in the present current collection period and a value obtained by filtering the current collected in the target current collection period, as the second current change rate.

3. The anti-pinch detection method according to claim 1, wherein the detecting whether the closure component contacts with an obstacle, based on the second current change rate comprises:
detecting the initial contact position based on the second current change rate, wherein the initial contact position is a position point at which the closure component starts to contact with the obstacle; and
determining that the closure component contacts with the obstacle when the initial contact position is detected.

4. The anti-pinch detection method according to claim 3, wherein the detecting the initial contact position based on the second current change rate comprises:
acquiring, when the second current change rate is greater than a preset first threshold, a motor position collected at present as a candidate initial contact position;
determining whether the candidate initial contact position is verified;
taking the candidate initial contact position as the initial contact position in response to a verification of the candidate initial contact position; and
in a case where the candidate initial contact position is not verified, performing the steps of determining the first current change rate based on the current collected in the present current collection period and the current collected in the previous current collection period, and determining the second current change rate based on the current collected in the present current collection period and the current collected in the target current collection period.

5. The anti-pinch detection method according to claim 4, wherein the determining whether the candidate initial contact position is verified comprises:
each time the current of the motor is collected after the candidate initial contact position is obtained, determining whether the candidate initial contact position is verified, based on the second current change rate determined in real time, and/or based on a third current change rate determined in real time and a third current change rate determined previously,
wherein each time the current of the motor is collected, the third current change rate is determined in real time based on the collected current and the current corresponding to the candidate initial contact position.

6. The anti-pinch detection method according to claim 5, wherein the determining whether the candidate initial contact position is verified, based on the second current change rate determined in real time, and/or based on a third current change rate determined in real time and a third current change rate determined previously comprises:

determining that the candidate initial contact position is not verified in a case where at least one of a first situation and a second situation occurs after the candidate initial contact position is obtained, and
determining that the candidate initial contact position is verified in a case where none of the first situation and the second situation occurs after the candidate initial contact position is obtained, wherein
the first situation is that the second current change rate determined in real time is less than a preset second threshold, and
the second situation is that a case where the third current change rate determined in real time and the third current change rate determined previously are greater than a preset third threshold successively occurs and a duration of the case that the third current change rate is greater than the third threshold is greater than a preset period.

7. The anti-pinch detection method according to claim 1, further comprising controlling the motor to operate at a motor speed corresponding to a region where the closure component is located, in the process of controlling the operation of the motor to drive the closure component to close,
wherein a movement region of the closure component in a closing direction comprises a plurality of regions that do not overlap each other, each of the regions corresponds to a set motor speed, different regions correspond to different motor speeds, and a region close to a terminal of the movement region in the closing direction corresponds to a smaller motor speed than a region away from the terminal.

8. An anti-pinch detection system, comprising a current collecting unit, a position collecting unit, and a controller, wherein
the controller is configured to:
control the current collecting unit to collect a current of a motor in a preset current collection period, in a process of controlling an operation of the motor to drive a closure component to close;
control the position collecting unit to collect a motor position of the motor in real time;
determine a first current change rate based on a current collected in a present current collection period and a current collected in a previous current collection period, wherein the previous current collection period is a current collection period before the present current collection period and immediately adjacent to the present current collection period;
determine a second current change rate based on the current collected in the present current collection period and a current collected in a target current collection period;
detect whether the closure component contacts with an obstacle based on the second current change rate;
determine a stiffness of the obstacle based on the first current change rate, in a case where the closure component is detected to contact with the obstacle;
determine a real-time obstacle compression distance based on an initial contact position and a motor position collected in real time; and
determine a real-time pinch force based on the stiffness of the obstacle and the real-time obstacle compression distance, and control the motor to reverse in a case where the real-time pinch force is greater than a preset anti-pinch detection threshold, wherein the target current collection period is a current collection period before the present current collection period and there are N current collection periods between the target current collection period and the present current collection period, where N is an integer greater than or equal to 2; the initial contact position is determined based on a motor position collected by the position collecting unit when the closure component is detected to contact with the obstacle; and the anti-pinch detection threshold is determined based on the stiffness of the obstacle.

9. The anti-pinch detection system according to claim 8, wherein the current collecting unit comprises a sampling resistor and a differential amplifier, wherein the sampling resistor is configured to convert a current in an operation process of the motor into a voltage signal; and the differential amplifier is configured to amplify the voltage signal to obtain an amplified voltage signal, and wherein the controller is configured to collect the current of the motor in the preset current collection period, based on the amplified voltage signal.

10. The anti-pinch detection system according to claim 8, wherein the controller is further configured to control the motor to operate at a motor speed corresponding to a region where the closure component is located, in the process of controlling the operation of the motor to drive the closure component to close, wherein a movement region of the closure component in a closing direction comprises a plurality of regions that do not overlap each other, each of the regions corresponds to a set motor speed, different regions correspond to different motor speeds, and a region close to a terminal of the movement region in the closing direction corresponds to a smaller motor speed than a region away from the terminal.

* * * * *